United States Patent

Becker et al.

[11] Patent Number: 5,910,654
[45] Date of Patent: Jun. 8, 1999

[54] APPARATUS AND METHOD FOR MEASURING FORMATION DENSITY IN RUGOSE BOREHOLES

[75] Inventors: Arthur J. Becker; Peter D. Wraight, both of Ridgefield, Conn.

[73] Assignee: Schlumberger Technology Corporation, Ridgefield, Conn.

[21] Appl. No.: 08/700,202

[22] Filed: Aug. 20, 1996

[51] Int. Cl.⁶ ..................................... G01V 5/12
[52] U.S. Cl. .................. 250/269.3; 250/267; 250/268; 250/269.1
[58] Field of Search ............... 250/269.3, 269.1, 250/268, 267

[56] References Cited

U.S. PATENT DOCUMENTS

| | | |
|---|---|---|
| 2,346,481 | 4/1944 | Garrison . |
| 2,942,111 | 6/1960 | Worthington . |
| 3,321,625 | 5/1967 | Wahl . |
| 3,864,569 | 2/1975 | Tittman . |
| 4,034,218 | 7/1977 | Turcotte . |
| 4,035,639 | 7/1977 | Boutemy et al. . |
| 4,047,027 | 9/1977 | Bateman et al. . |
| 4,048,495 | 9/1977 | Ellis . |
| 4,117,394 | 9/1978 | Souhaité . |
| 4,614,250 | 9/1986 | Panetta et al. . |
| 4,661,700 | 4/1987 | Holenka . |
| 4,816,674 | 3/1989 | Ellis et al. . |
| 4,958,073 | 9/1990 | Becker et al. . |
| 5,134,285 | 7/1992 | Perry et al. ........................... 250/269.3 |
| 5,390,115 | 2/1995 | Case et al. . |
| 5,517,024 | 5/1996 | Mullins et al. . |
| 5,530,243 | 6/1996 | Mathis . |
| 5,680,431 | 10/1997 | Pietras, III et al. ..................... 379/119 |

FOREIGN PATENT DOCUMENTS

| | | | |
|---|---|---|---|
| 1371927 | 8/1964 | France ................................. 250/269.1 |
| 285726 | 2/1978 | U.S.S.R. ................................. 250/268 |

OTHER PUBLICATIONS

Robert E. McMurray, Jr., et al., MeV Gamma Ray Detection Algorithms for Stacked Silicon Detectors, *IEEE Transactions on Nuclear Science*, vol. 40, No. 4 (Aug. 1993) pp. 882–889, is cited in the specification and describe a layered detector.

Victor V. Verbinski, et al., Graded–Z Flash–Bremsstrahlung Depth–Dose Spectrometer, *Nuclear Instruments and Methods* 137 (1976) pp. 243–249, describes a depth–dose spectrometer for measuring photon spectra from a single, short, intense burst of photons.

D. Ellis et al., The Litho–Density Tool Calibration, SPE 12048 (1983), describes the Litho–Density Tool (LDT) which uses a gamma–ray source and two NaI scintillator detectors for borehole measurement of electron density.

*Primary Examiner*—Constantine Hannaher
*Attorney, Agent, or Firm*—David Garrod; Keith G.W. Smith

[57] ABSTRACT

A method/apparatus for determining the density of a formation traversed by a borehole having irregularities along the borehole wall preferably employs/includes a housing, a photon source, and a detector. The source preferably includes an irradiation path extending from the source to a side of the housing. Similarly, the detector preferably includes a detection path extending from the detector to the side of the housing. A stylus may be mounted onto the housing for penetrating through a layer of mudcake. Such stylus preferably includes a base and a substantially small contact head having a window fixedly attached thereto. A second irradiation path may extend from the base to the contact head. A second detection path may also extend from the base to the contact head. The irradiation and detection paths in the stylus are preferably substantially aligned with respective irradiation and detection paths in the housing.

11 Claims, 4 Drawing Sheets

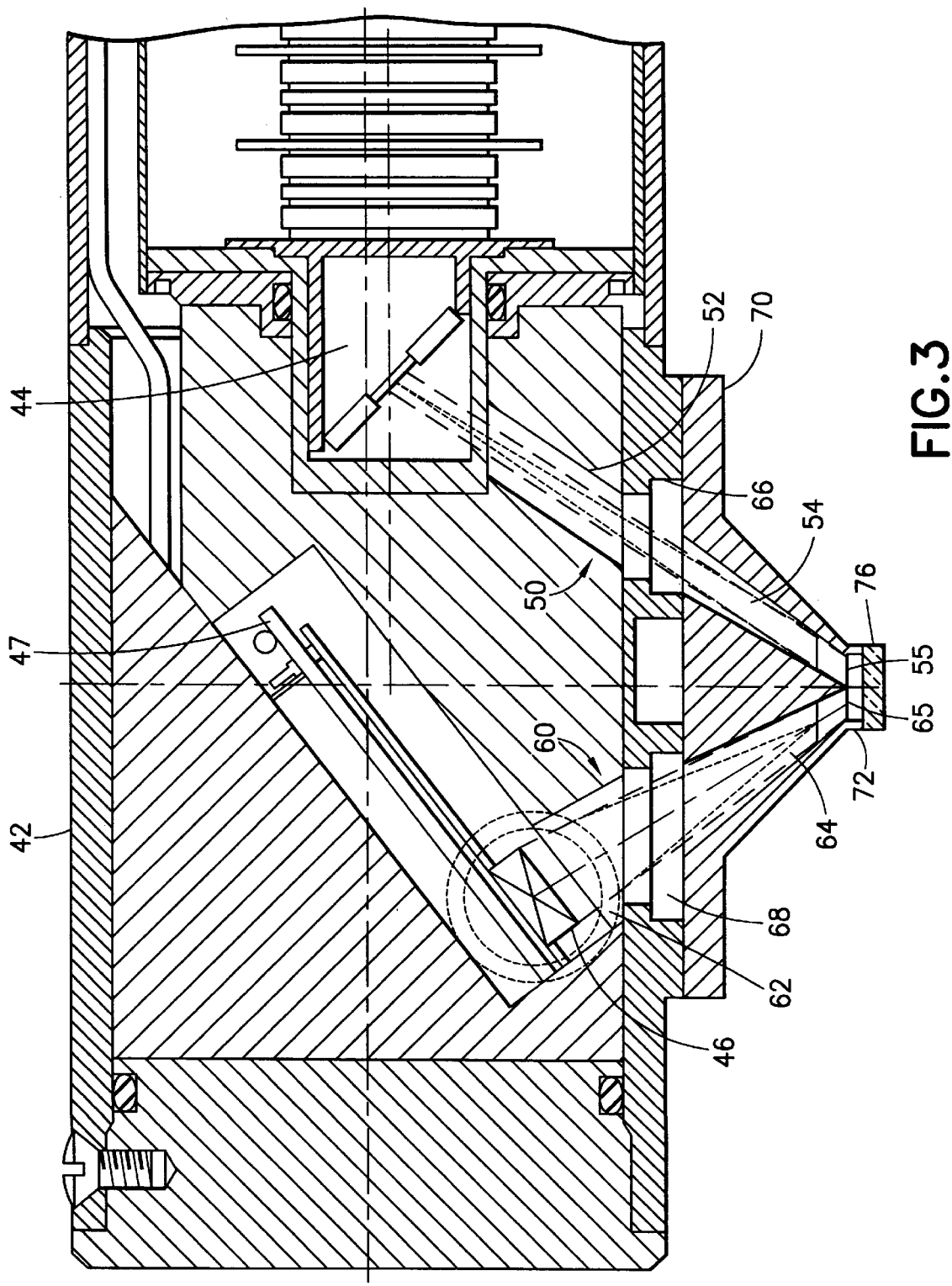

APPARATUS AND METHOD FOR MEASURING FORMATION DENSITY IN RUGOSE BOREHOLES

CROSS-REFERENCES

This present application is related to application Ser. No. 08/630,736, filed Apr. 10, 1996, now U.S. Pat. No. 5,680,431 which is incorporated herein by this reference.

BACKGROUND OF THE INVENTION

The present invention relates generally to tools for investigating a borehole traversing an earth formation, and more particularly, to an apparatus and method for measuring formation density in a borehole having irregularities along the borehole wall.

Gamma-gamma well logging instruments utilizing gamma ray sources and gamma detectors for obtaining indications of the density and $P_e$ of the formation surrounding a borehole are well known. A typical such device comprises a long, rigid sonde body containing a gamma ray radioisotopic source and at least one gamma ray detector separated by depth by about forty centimeters. The sonde, when applied against the borehole wall, will span irregularities along the borehole wall, leading to inaccurate corrections for environmental effects, such as detector standoff, under rugose conditions.

It has long been recognized that the accuracy of measurements of the density of earth formations adjacent a borehole by gamma-gamma logging is greatly affected by variations in the thickness of the mudcake formed on the wall of the borehole. In conducting density and $P_e$ determinations, it has been found to be beneficial to compensate for variations in mudcake thickness by utilizing a sonde having two gamma ray detectors located at different distances from the source as may be seen with reference to U.S. Pat. Nos. 3,321,625 to J. Wahl, 3,864,569 to J. Tittman, 4,034,218 to R. Turcotte, 4,048,495 to D. Ellis, 4,661,700 to J. Holenka, and 4,958,073 to D. Ellis. In these two detector tools, it is assumed that the borehole wall is reasonably smooth. If the borehole wall is not smooth, the sonde obtains erroneous density measurements due to the fact that the source, or either of the detectors may be exposed to a different thickness of mudcake. Attempts have been made to overcome environmental effects, such as rugosity, by making explicit measurements of the size of the environmental factor causing the effect and then making explicit corrections. U.S. Pat. Nos. 4,047,027 and 4,035,639 are exemplary of previous techniques that utilize this measurement and correction approach. While the technique disclosed in these patents has its merits, it has the disadvantage of requiring the additional apparatus necessary for making an explicit measurement of source and/or detector standoff. Other attempts have been made to overcome variations in mudcake thickness by using three or more detectors as may be seen with reference to U.S. Pat. Nos. 5,390,115 and 5,530,243. In these three or more detector tools, if the borehole wall is not smooth, the sonde will not make perfect contact with the borehole wall over the entire length of the tool thereby still requiring an explicit correction for irregularities in the region of source and/or detector standoff.

SUMMARY OF THE INVENTION

The above disadvantages of the prior art are overcome by means of the subject invention. A method for determining the density of a formation traversed by a borehole having irregularities along the borehole wall comprises the step of lowering into the borehole a sonde having a resilient member mounted thereon. The member is equipped with a backscatter detection device having a photon source, a detector, and a substantially small contact head. The method further comprises the steps of urging the member towards the borehole wall facing the contact head and positioning the contact head on the borehole wall. After irradiating the formation with photons, detecting and generating a count rate signal responsive to the photons detected by the detector, the count rate signals are processed to derive the density and $P_e$ of the formation.

An apparatus for determining the density of a formation traversed by a borehole having irregularities along the borehole wall comprises a housing, a photon source, and a detector. The source has an irradiation path extending from the source to a side of the housing. Similarly, the detector has a detection path extending from the detector to the side of the housing. A stylus is mounted onto the housing for penetrating through a layer of mudcake. The stylus comprises a base and a substantially small contact head having a window fixedly attached thereto. A second irradiation path extends from the base to the contact head. A second detection path extends from the base to the contact head. The irradiation and detection paths in the stylus are substantially aligned with the respective irradiation and detection paths in the housing.

BRIEF DESCRIPTION OF THE DRAWINGS

The advantages of the present invention will become apparent from the following description of the accompanying drawings. It is to be understood that the drawings are to be used for the purpose of illustration only, and not as a definition of the invention.

In the drawings:

FIG. 3 is a sectional view of the apparatus;

DETAILED DESCRIPTION OF THE PREFERRED EMBODIMENT

Figure 1:
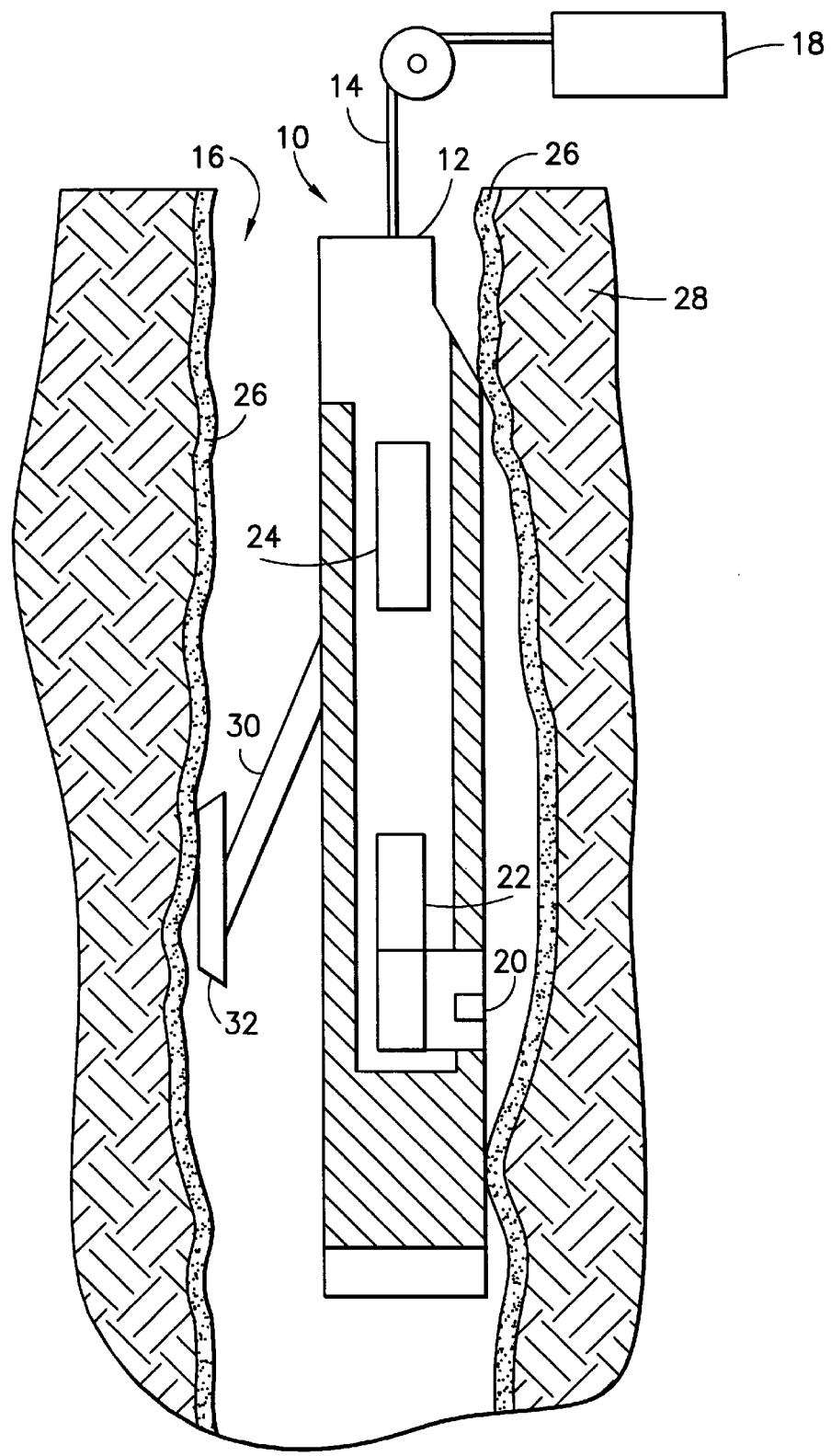
FIG. 1 illustrates a prior art sonde having a source and two detectors.

FIG. 1 illustrates a prior art device spanning irregularities along a borehole wall. The sonde 10 consists of a pressure resistant housing 12 suspended by an armored cable 14 in a borehole 16. Cable 14 comprises insulated conductors that electrically connect the equipment within the housing 12 with a data processing system 18 at the surface. A winch (not shown) is located at the surface and uses the cable 14 to lower and raise the sonde 10 in the borehole 16 to traverse the earth formation 28. A gamma ray source 20, near detector 22, and far detector 24 are located inside the housing 12. The far detector 24 is spaced at least 24–40 cm from the source 20.

During the drilling process, the borehole 16 may be filled with drilling mud. The liquid portion of the drilling mud flows into the formation leaving behind a deposited layer of solid mud materials on the interior wall of the borehole in the form of a mudcake 26. The sonde 10 is urged against the mudcake wall 26 by means of a linkage arm 30 and eccentering skid 32 so that the source 20 and detectors 22, 24 can be urged close to the formation 28. As illustrated, the borehole wall may be washed out or otherwise eroded or may contain other irregularities so that the sonde 10 is incapable of being urged flush against the formation 28 thereby creating a tool standoff condition. A better contact between the sonde 10 and the formation 28 would require excessively great application forces by arm 30.

Figure 2:
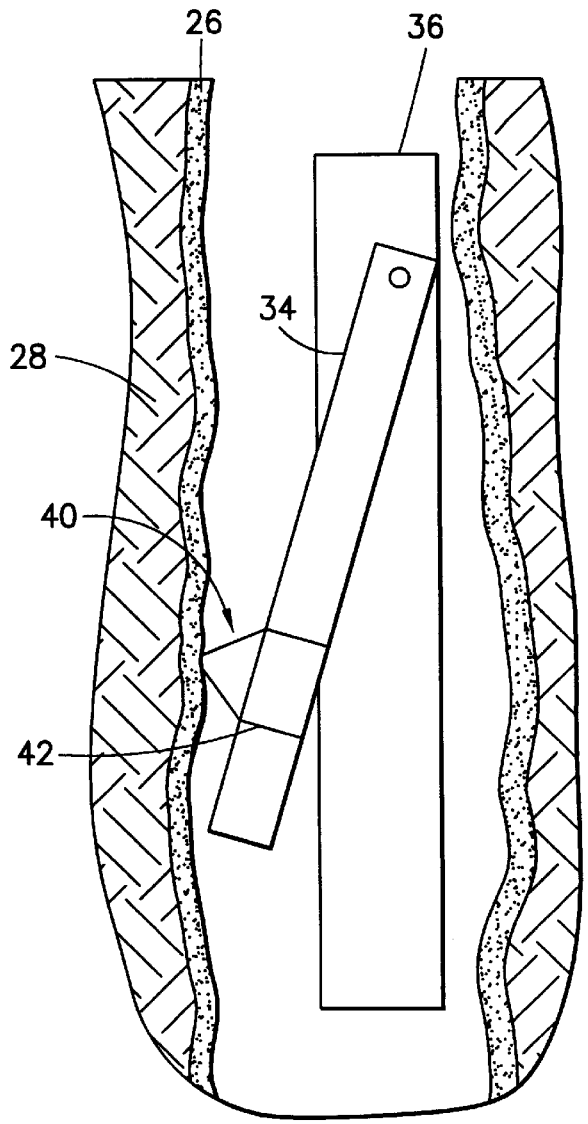
FIG. 2 depicts an apparatus according to the invention attached to a sonde.

Referring to FIGS. 2 and 3, an apparatus 40 according to the invention is shown mounted onto arm 34 which is pivotally mounted on the sonde housing 36. A power apparatus (not shown) actuates the arm 34 to pivot towards the formation 28. With a reasonable force applied to the arm 34, the apparatus 40 penetrates the mudcake layer 26 and engages the formation 28. The apparatus 40 comprises a housing 42 which contains source 44 and a single, closely spaced detector 46 in the backscatter geometry. Connected to the detector 46 are detector electronics 47 which may be used to discriminate the pulses associated with the detector 46 into various energy windows. In a preferred embodiment, source 44 is a medium energy x-ray generator in the 120–150 keV range and detector 46 comprises a cadmium zinc telluride crystal. A radioisotopic source 44 such as $^{137}$Cs, $^{133}$Ba, or $^{57}$Co and a detector 46 comprising a compact scintillator are also within contemplation of this invention. Source 44 and detector 46 are substantially surrounded by shielding 48 so as to prevent photons from directly reaching the detector 46 without entering the formation 28 and scattering back to detector 46. Source collimator 50 has an upper portion 52 which extends from housing 42 to the source 44. Detector collimator 60 has an upper portion 62 which extends from housing 42 to the detector 46. Window 66 permits photons from the source 44 to leave the housing 42 and window 68 permits the detection of backscattered radiation. Windows 66 and 68 are preferably a low density, low-Z window comprised of beryllium or a similar material.

A stylus 70 may be fixedly or demountably attached to the housing 42. Stylus 70 contains a lower portion 54, 64 of the collimators 50, 60. With this geometry, by modifying the size of collimators 50, 60 and collimator apertures 55, 65, the intersection of the source and detector energy projections into the formation can range from shallow, on the order of about 2 mm, to a deep projection, on the order of about 1 cm. A contact head 72 defines the point of contact of apparatus 40 with the formation 28. Contact head 72 includes the openings for the lower portion 54, 64 of collimators 50, 60. A substantially small point of contact permits the apparatus 40 to pierce through the mudcake layer 26 and establish intimate contact with the formation 28 in the presence of irregularities along the borehole wall. Also, the small contact area diminishes the likelihood of standoff under rugose conditions. Hence, a correction for mudcake thickness or source and/or detector standoff is unnecessary. To pierce through the mudcake 26 and facilitate flush contact with the borehole wall, the contact head 72 should have a width, measured transverse to the borehole axis, less than approximately 5 cm and length, measured parallel to the borehole axis, less than approximately 15 cm. In a preferred embodiment of the invention, contact head 72 has a width of approximately 1 cm and a length of approximately 1.2 cm. The stylus 70 includes a window 76 fixedly mounted onto the contact head 72 through which the source 44 irradiates the formation with photons and through which the backscattered photons travel to the detector 46. Window 76 is comprised of a material that is hard and able to withstand the pressures in the borehole environment. A suitable material is sapphire, hard-coated aluminum, or other materials with similar properties.

Figure 4:
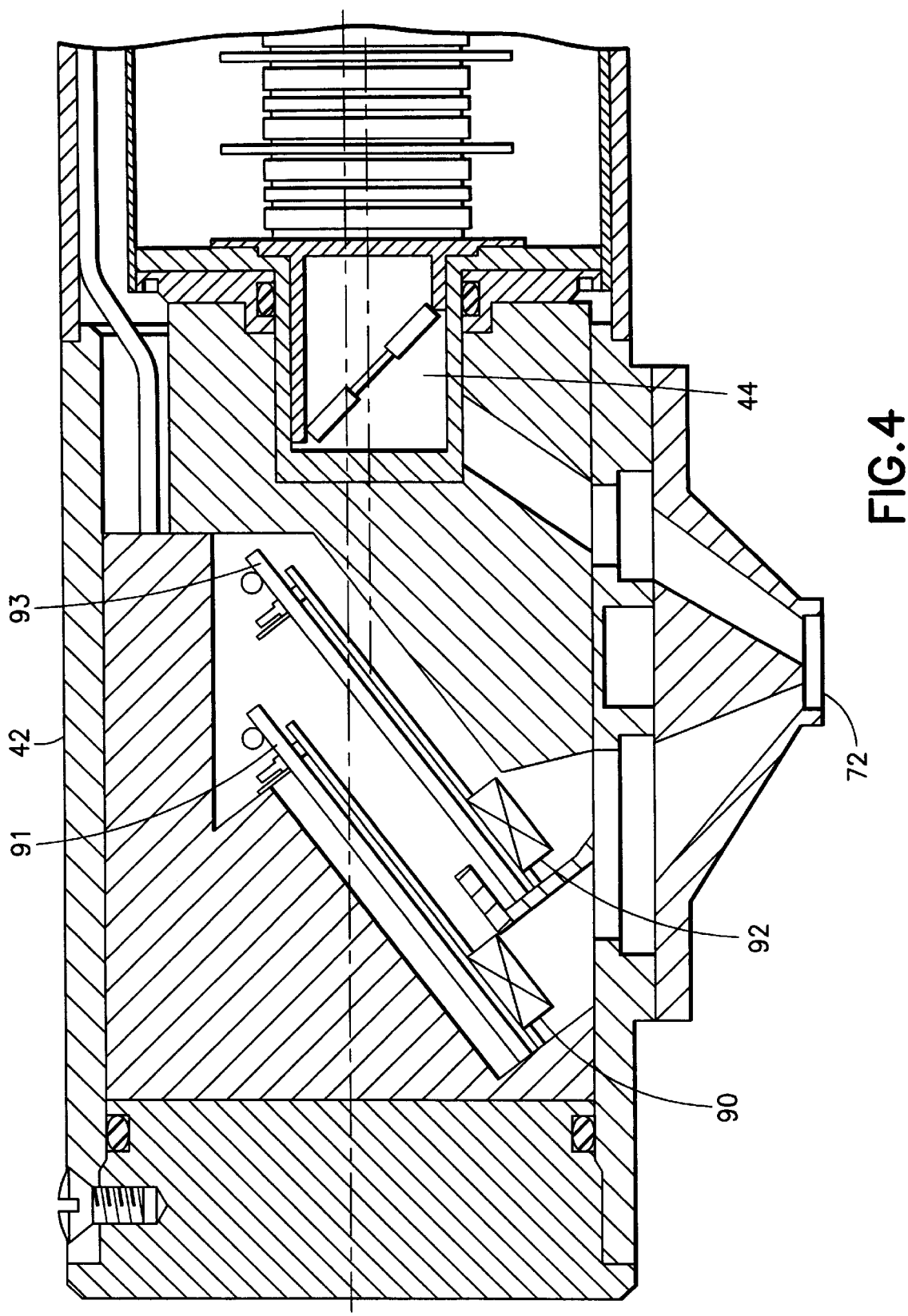
FIG. 4 is an alternative embodiment of the apparatus with a plurality of detectors; and, FIG. 5 shows an apparatus having an internal calibration device.

In the alternative embodiment depicted in FIG. 4, the apparatus 40 comprises a housing 42 which contains source 44 and a plurality of closely spaced detectors 90, 92 in the backscatter geometry. Connected to the detectors 90, 92 are detector electronics 91, 93 which may be used to discriminate the pulses associated with the detectors 90, 92 into various energy windows. This embodiment decreases the sensitivity of detectors 90, 92 to remnant mudcake and tilt between the contact head 72 and the formation wall 28.

Figure 5:
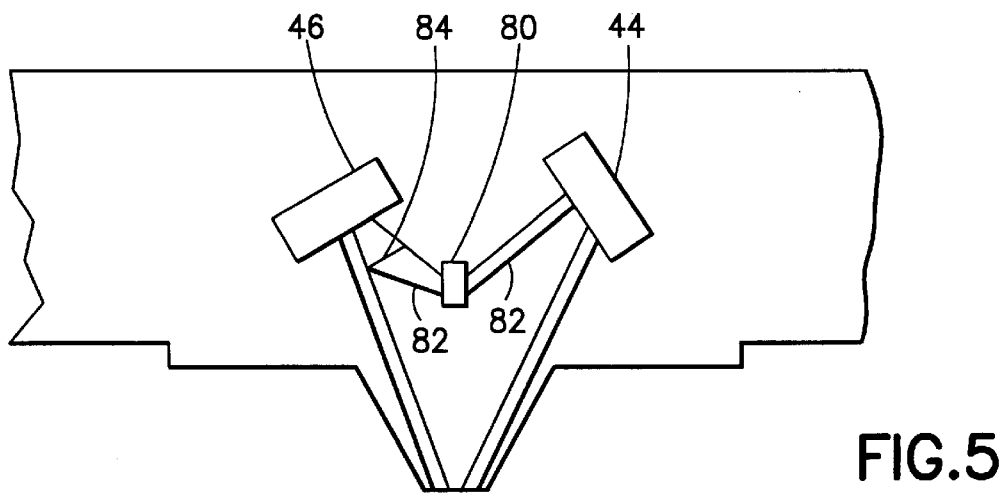

Referring to FIG. 5, the geometry of the apparatus 40 allows for internal calibration of the source 44 and detector 46. The housing 42 includes a calibrator material 80 placed along calibration path 82. A shutter 84 placed near the source 44 or detector 46 will block the radiation/detection path to the formation 28 and expose the path 82 to a calibrator material 80, such as graphite, magnesium, or aluminum, which has a known density and $P_e$ comparable to those of typical earth formations. Assuming that the count rate is linearly dependent on density and $P_e$, or on density and U, the product of density×$P_e$, it is straightforward to derive the formation density from the count rate and proximate measurement of the calibrator material 80. If the count rates and density have a non-linear relationship, the method of calibration may involve least squares fitting, differential methods, or other mathematical techniques to handle higher degrees of variability.

In operation, the sonde 36 is placed downhole, lowered to a desired longitudinal depth, and a resilient member 34 urges the stylus 70 towards the borehole wall. The contact head 72 pierces through the mudcake layer 26 and establishes intimate contact with the formation 28. The source 44 irradiates the formation 28 with photons and the detector 46 detects backscattered photons The detector electronics 47 can determine the counts associated with each of a plurality of predetermined energy windows. Modeling results indicate that by modifying the size of collimators 50, 60 and collimator apertures 55, 65, the intersection of the source and detector energy projections into the formation can range from shallow, on the order of about 2 mm, to a deep projection, on the order of about 1 cm. The modeled effect of geometry on density sensitivity and $P_e$ for a 125 keV electron beam are illustrated in Table I wherein density sensitivity is defined as the percent change in count rate per percent change in formation density and the count rate is defined as kHz per Watt of electron beam power on the X-ray target.

TABLE I

|  | Detector Threshold Energy | Shallow Geometry | Deep Geometry |
| --- | --- | --- | --- |
| Density Sensitivity | 70 keV | .88%/% | .73%/% |
|  | 80 keV | .90%/% | .77%/% |
| Average Effect of Lime/Sand $P_e$ Difference on Density Result | 70 keV | .13 g/cm$^3$ | .3 g/cm$^3$ |
|  | 80 keV | .05 g/cm$^3$ | .2 g/cm$^3$ |
| Count Rate in kHz/W | 70 keV | 7 kHz/W | 60 kHz/W |
|  | 80 keV | 3 kHz/W | 20 kHz/W |

Table I indicates that a shallow geometry and/or a higher detector energy threshold yields better density sensitivity and less $P_e$ influence, but also lower count rates. A substantially independent $P_e$ would require a higher detector threshold and source energy. Using low energy windows, such as 40–60 keV, and high energy windows>70 keV will allow for separation of $P_e$ and density. With an intense X-ray source 44, there can be a very high rate of X-rays reaching the detector 46. The rate can be so high that identifying and counting individual pulses from the detector 46 is impractical. In that case, detection is performed in the integrated-flux mode, also known as the current mode, where energy window information is obtained by layering two or more detectors. The front-most detector, typically thin, is most responsive to the lower energy X-rays; and the rear-most detector, typically thick, receives and is responsive to the higher energy X-rays. An example of a layered detector is described in Robert McMurray, Jr., et al., *MeV Gamma Ray Detection Algorithms for Stacked Silicon Detectors*, IEEE TRANSACTIONS ON NUCLEAR SCIENCE, August 1993, at 882.

The foregoing description of the preferred and alternate embodiments of the present invention have been presented for purposes of illustration and description. It is not intended to be exhaustive or limit the invention to the precise form disclosed. While the invention relates to an apparatus and method for measuring formation density in a borehole having irregularities along the borehole wall, the invention is similarly useful for measuring formation density in a borehole having a reasonably smooth wall. Obviously, many modifications and variations will be apparent to those skilled in the art. As can be seen, FIG. 2 illustrates the practice of the invention with a wireline tool. While so illustrated, it should be evident that the invention may be practiced with a logging-while-drilling tool. FIG. 2 also illustrates a pivotal arm, however, a bow spring or other resilient means may be used to maintain the apparatus in contact with the borehole wall. The embodiments were chosen and described in order to best explain the principles of the invention and its practical application thereby enabling others skilled in the art to understand the invention for various embodiments and with various modifications as are suited to the particular use contemplated. It is intended that the scope of the invention be defined by the accompanying claims and their equivalents.

What I claim is:

1. A method for determining the density of a formation traversed by a borehole having irregularities along the borehole wall, comprising the steps of:

lowering into the borehole a sonde having a resilient member mounted thereon, the member being equipped with a backscatter detection device having a photon source, a detector, and a substantially small contact head;

urging the member towards the borehole wall facing the contact head so as to establish intimate contact with the formation despite the presence of irregularities along said borehole wall;

positioning the contact head on the borehole wall;

irradiating the formation with photons from the source;

detecting photons scattered by the formation using the detector;

generating count rate signals responsive to the photons detected by the detector; and, processing the count rate signals to derive the density of the formation.

2. The method according to claim 1 wherein the step of positioning the contact head on the borehole wall further comprises the step of penetrating through a layer of mudcake on the borehole wall.

3. The method according to claim 2 wherein the source is an x-ray generator.

4. The method according to claim 3 wherein the detector comprises a cadmium zinc telluride crystal.

5. The method according to claim 2 wherein the source is a radioisotopic source.

6. An apparatus for determining the density of a formation traversed by a borehole having irregularities along the borehole wall, comprising:

a housing;

a photon source located within the housing, the source having a first irradiation path extending from the source to a side of the housing;

a detector located within the housing, the detector having a first detection path extending from the detector to the side of the housing;

a stylus mounted onto the side of the housing for penetrating through a layer of mudcake, the stylus comprising:

a base;

a substantially small contact head adapted to establish intimate contact with the formation despite the presence of irregularities along the borehole wall, said contact head having a window fixedly attached thereto;

a second irradiation path extending from the base to the contact head so that the first and second irradiation paths are substantially aligned; and, a second detection path extending from the base to the contact head so that the first and second detection paths are substantially aligned.

7. The apparatus according to claim 6 wherein the contact head has a width of approximately 1 cm to approximately 5 cm and a length of approximately 1.2 cm to approximately 15 cm.

8. The apparatus according to claim 6 wherein the contact head has a width of approximately 1 cm and a length of approximately 1.2 cm.

9. The apparatus according to claim 6 further comprising a plurality of windows separating the first and second irradiation paths and the first and second detection paths.

10. The apparatus according to claim 6 further comprising an auxiliary detector located within the housing, the auxiliary detector having an auxiliary detection path extending from the detector to the side of the housing, the auxiliary detection path in substantial alignment with the second detection path.

11. The apparatus according to claim 6 wherein the detector comprises a layered detector.

* * * * *